United States Patent [19]

Hoek et al.

[11] Patent Number: 4,925,820
[45] Date of Patent: May 15, 1990

[54] HYDROCARBON CONVERSION PROCESS AND CATALYSTS

[75] Inventors: Arend Hoek; Tom Huizinga; Ian E. Maxwell, all of Amsterdam, Netherlands

[73] Assignee: Shell Oil Company, Houston, Tex.

[21] Appl. No.: 344,589

[22] Filed: Apr. 28, 1989

Related U.S. Application Data

[62] Division of Ser. No. 55,672, May 29, 1987, Pat. No. 4,857,171.

[30] Foreign Application Priority Data

May 30, 1986 [GB] United Kingdom ............... 8613131

[51] Int. Cl.$^5$ .................................... B01J 29/06
[52] U.S. Cl. ................................ 502/66; 502/64; 502/74
[58] Field of Search ........................ 502/79, 66, 74

[56] References Cited

U.S. PATENT DOCUMENTS

| | | | |
|---|---|---|---|
| 3,391,075 | 7/1968 | Plank et al. | 502/79 |
| 3,778,365 | 11/1973 | Hamner et al. | 502/79 |
| 3,875,081 | 4/1975 | Young | 502/79 |
| 3,887,630 | 6/1975 | Ward | 502/79 |
| 4,148,759 | 4/1979 | Hilfman | 502/79 |
| 4,259,212 | 3/1981 | Gladrow et al. | 502/79 |
| 4,563,434 | 1/1986 | Ward et al. | 502/79 |
| 4,663,025 | 5/1987 | Fu | 502/79 |

*Primary Examiner*—Carl F. Dees

[57] ABSTRACT

A process for converting hydrocarbon oils into products of low average molecular weight and lower average boiling point comprising contacting a hydrocarbon oil at elevated temperature and pressure in the presence of hydrogen with a catalyst comprising a modified Y zeolite having a unit cell size below 24.45 Å, a degree of crystallinity which is at least retained at increasing $SiO_2/Al_2O_3$ molar ratios, a water adsorption capacity (at 25° C. and a $p/p_o$ value of 0.2) of at least 8% by weight of modified zeolite and a pore volume of at least 0.25 ml/g wherein between 10% and 60% of the total pore volume is made up of pores having a diameter of at least 8 nm, an amorphous cracking component, a binder and at least one hydrogenation component of a Group VI metal and/or at least one hydrogenation component of a Group VIII metal. The invention also relates to catalyst compositions suitable for use in said process.

16 Claims, No Drawings

HYDROCARBON CONVERSION PROCESS AND CATALYSTS

This is a division, of application Serial No. 055,672, filed May 29, 1987, now U.S. Pat. No. 4,857,171.

FIELD OF THE INVENTION

The present invention relates to hydrocarbon conversion processes and catalysts which can be used in such processes. The present invention also relates to compositions of matter suitable as catalyst or catalyst base in hydroprocessing, particularly in hydrocracking.

BACKGROUND OF THE INVENTION

Of the many hydroconversion processes known in the art, hydrocracking is becoming increasingly important since it offers product flexibility together with product quality. As it is also possible to subject rather heavy feedstocks to hydrocracking it will be clear that much attention has been devoted to the development of hydrocracking catalysts.

Modern hydrocracking catalysts are generally based on zeolitic materials which may have been adapted by techniques like ammonium ion exchange and various forms of calcination in order to improve the performance of the hydrocracking catalysts based on such zeolites.

One of the zeolites which is considered to be a good starting material for the manufacture of hydrocracking catalysts is the well-known synthetic zeolite Y as described in U.S. Pat. No. 3,130,007 issued April 21, 1964. A number of modifications has been reported for this material which include, inter alia, ultrastable Y (U.S. Pat. No. 3,536,605 issued Oct. 27, 1970) and ultrahydrophobic Y (U.K. Patent Application GB-A-2,014,970, published Sept. 5, 1979). In general, it can be said that the modifications cause a reduction in the unit cell size depending on the treatment carried out.

The ultrahydrophobic Y zeolites as described in GB-A-2,014,970 are also referred to in European Patent Application EP-B-28,938 published May 20, 1981, and European Patent Specification EP-B-70,824 published February 5, 1986, as suitable components for hydrocracking catalysts. From said publications it appears that such zeolites have an intrinsically low water adsorption capacity. Water adsorption capacities below 5% (EP-B-28,938), respectively 8% (Specification EP-B-70,824) by weight of zeolite are considered to be the maximum levels acceptable and it is confirmed experimentally in EP-B-28,938 that a water adsorption capacity of 8.5% by weight on zeolite causes a drastic decrease in selectivity.

In European Patent Application EP-A-162,733 published Nov. 11, 1985, zeolite Y components for hydrocracking catalysts are described which must possess a rather stringent pore diameter distribution which in essence means that at least 80% of the total pore volume is made up of pores having a diameter of less than 2 nm, and preferably at least 85% of the total pore volume is made up of pores having a diameter of less than 2 nm.

In U.K. Patent Application GB-A-2,114,594 published Aug. 24, 1983, a process for the production of middle distillates is disclosed wherein use is made of catalysts comprising so-called expanded pore faujasitic zeolites. The pore expansion referred to in said patent specification has been obtained by firstly steaming the faujasitic zeolite at a temperature of at least 538° C., in particular at a temperature above 760° C., followed by contacting the steamed faujasitic zeolite with an acid, preferably an acid having a pH less than 2. It should be noted that the degree of crystallinity retained in the expanded pore zeolite dramatically decreases at increasing amounts of acid used (see FIG. 3 of GB-A-2,114,594). Since the $SiO_2/Al_2O_3$ molar ratio substantially increases linearly with the amounts of acid used (see FIG. 2) it appears that the crystallinity of the faujasitic zeolites treated according to the process described in GB-A-2,114,594 intrinsically decreases at increasing $SiO_2/Al_2O_3$ molar ratios.

It has now been found that the presence of certain modified Y zeolites together with an amorphous cracking component in hydrocracking catalysts gives an unexpected high selectivity to the desired product(s) combined with a significantly lower gas make than experienced thus far with catalysts based on Y zeolite. Also substantial amounts of polynaphthenic compounds present in the feed to be processed, which compounds are notoriously difficult to process, if at all, can be conveniently converted in the process according to the present invention.

It has now been found that the presence of amorphous cracking components has a significant impact on the conversion of polynaphthenic compounds. The expression "polynaphthenic compounds" as used herein should be understood as relating to polynaphthenic compounds which as measured by mass spectroscopy have four or more rings in their respective structures which are predominantly condensed. Moreover, it was found that the quality of the product(s) was improved despite a lower hydrogen consumption. These improvements are even more remarkable since they can be achieved with catalysts showing a higher activity than thus far achievable with Y type zeolites.

SUMMARY OF THE INVENTION

The present invention relates to a process for converting hydrocarbon oils into products of lower average molecular weight and lower average boiling point comprising contacting a hydrocarbon oil at elevated temperature and pressure in the presence of hydrogen with a catalyst comprising a modified Y zeolite having a unit cell size below 4.45 Å, a degree of crystallinity which is at least retained at increasing $SiO_2/Al_2O_3$ molar ratios, a water adsorption capacity (at 25° C. and a $p/p_o$ value of 0.2) of at least 8% by weight of modified zeolite and a pore volume of at least 0.25 ml/g wherein between 10% and 60% of the total pore volume is made up of pores having a diameter of at least 8 nm, an amorphous cracking component, a binder and at least one hydrogenation component of a Group VI metal and/or at least one hydrogenation component of a Group VIII metal.

DESCRIPTION OF THE PREFERRED EMBODIMENTS

Preferably catalysts are used wherein between 10% and 40% of the total pore volume of the modified Y zeolite is made up of pores having a diameter of at least 8 nm. The pore diameter distribution is determined by the method described by E. P. Barrett, G. Joyner and P. P. Halenda (J. Am. Chem. Soc. 73, 373 (1951)) and is based on the numerical analysis of the nitrogen desorption isotherm. It should be noted that inter-crystalline voids are excluded in the determination of the percentage of the total pore volume made up in pores having a diameter of at least 8 nm when said percentage is between 10% and 40%.

It has been found that very good results in terms of performance and activity as well as conversion of unwanted polynaphthenic compounds can be obtained when modified Y zeolites are used having a water adsorption capacity of at least 10% by weight on zeolite, in particular between 10% and 15% by weight of zeolite. The water adsorption capacity of the modified Y zeolites present in the catalysts according to the present invention invention is measured at 25° C. and a $p/p_o$ value of 0.2. In order to determine the water adsorption capacity the modified Y zeolite is evacuated at elevated temperature, suitably 400° C., and subsequently subjected at 25° C. to a water pressure corresponding to a $p/p_o$ value of 0.2 (ratio of the partial water pressure in the apparatus and the saturation pressure of water at 25° C.).

The unit cell size of the modified Y zeolites present in the catalyst compositions to be used in process according to the present invention is below 24.45 Å (as determined by ASTM-D-3492, the zeolite being present in its $NH_4^+$-form) and preferably below 24.40 Å, in particular below 24.35 Å. It should be noted that the unit cell size is but one of the parameters which determine the suitability of modified Y zeolites. It has been found that also the water adsorption capacity and the pore diameter distribution as well as the crystallinity have to be taken into account in order to be able to obtain marked improvements in performance as referred to hereinbefore.

As regards crystallinity it should be noted that the modified Y zeolites according to the present invention should at least retain their crystallinity (relative to a certain standard, e.g., Na—Y) when comparing crystallinity as a function of increasing $SiO_2/Al_2O_3$ molar ratio. Generally, the crystallinity will slightly improve when comparing modified Y zeolites with increasing $SiO_2/Al_2O_3$ molar ratios.

The catalyst compositions to be used in the process according to the present invention suitably comprise 50-90% by weight of modified Y zeolite and amorphous cracking catalyst and 10-50% by weight of binder. Preferably the catalyst compositions comprise rather high amounts of modified Y zeolite: 60-85% by weight of modified Y zeolite and amorphous cracking component and 15-40% by weight of binder being particularly preferred.

The process according to the present invention is suitably carried out by using a catalyst wherein the amount of modified Y zeolite ranges between 5 and 95% of the combined amount of modified Y zeolite and amorphous cracking component. In particular, the process according to the present invention is carried out by using a catalyst wherein the amount of modified Y zeolite ranges between 10 and 75% of the combined amount of modified Y zeolite and amorphous cracking component.

Suitably, silica-based amorphous cracking components can be used in the process according to the present invention. Preference is given to the use of silica-alumina as amorphous cracking component. The amount of silica in silica-based cracking components suitably comprises 50-95% by weight. Also so-called X-ray amorphous zeolites (i.e. zeolites having crystallite sizes too small to be detected by standard X-ray techniques) can be suitably applied as cracking components in the process according to the present invention.

The binder(s) present in the catalyst compositions suitably comprise inorganic oxides. Both amorphous and crystalline binders can be applied. Examples of suitable binders comprise silica, alumina, clays and zirconia. Preference is given to the use of alumina as binder.

Depending on the desired unit cell size the $SiO_2/Al_2O_3$ molar ratio of the modified Y zeolite will have to be adjusted. There are many techniques described in the art which can be applied to adjust the unit cell size accordingly. It has been found that modified Y zeolites having a $SiO_2/Al_2O_3$ molar ratio between 4 and 25 can be suitably applied as the zeolite component of the catalyst compositions according to the present invention. Preference is given to modified Y zeolites having a molar $SiO_2/Al_2O_3$ ratio between 8 and 15.

Suitably, the catalyst compositions to be used in the process according to the present invention comprise one or more components of nickel and/or cobalt and one or more components of molybdenum and/or tungsten or one or more components of platinum and/or palladium.

The amount(s) of hydrogenation component(s) in the catalyst compositions suitably range between 0.05 and 10% by weight of Group VIII metal component(s) and between 2 and 40% by weight of Group VI metal component(s), calculated as metal(s) per 100 parts by weight of total catalyst. The hydrogenation components in the catalyst compositions may be in the oxidic and/or the sulphidic form. If a combination of at least a Group VI and a Group VIII metal component is present as (mixed) oxides, it will be subjected to a sulphiding treatment prior to proper use in hydrocracking.

Hydroconversion process configurations in accordance with the present invention are those wherein a substantial reduction in average molecular weight and boiling point can be accomplished by contacting the feed with a catalyst composition comprising a modified Y zeolite, an amorphous cracking component and a binder as described hereinbefore.

Examples of such processes comprise single-stage hydrocracking, two-stage hydrocracking, series-flow hydrocracking as well as mild hydrocracking.

It will be appreciated that the hydroconversion processes in accordance with the present invention can also be carried out suitably in bunker-type operations, i.e., by using reactor vessels allowing for periodical or intermittent catalyst removal and replenishment. Use can be made of the various bunker-techniques described in the art.

Feedstocks which can be suitably applied in the process according to the present invention comprise gas oils, vacuum gas oils, deasphalted oils, long residues, catalytically cracked cycle oils, coker gas oils and other thermally cracked gas oils and syncrudes, optionally originating from tar sands, shale oils, residue upgrading processes or biomass. Combinations of various feedstocks can also be applied.

It may be desirable to subject part or all of the feedstock to one or more (hydro)treatment steps prior to its use in the hydrocarbon conversion process according to the present invention. It is often found convenient to subject the feedstock to a (partial) hydrotreatment. When rather heavy feedstocks are to be processed it will be advantageous to subject such feedstocks to a (hydro) demetallization treatment.

Suitable process conditions to be applied comprise temperatures in the range of from 250° C. to 500° C., pressures up to 300 bar and space velocities between 0.1 and 10 kg feed per liter of catalyst per hour (kg/1/h). Gas/feed ratios between 100 and 5000 Nl/kg feed (normal liters at standard temperature and pressure per kilogram) can suitably be used.

It has been found that at least 10% by weight of polynaphthenic components (either already present in the starting material or accumulated therein via recycle operation) can be converted in addition under the prevailing reaction conditions at a gross conversion level of at least 40% by weight per pass.

Preferably, the hydroconversion process according to the present invention is carried out at a temperature between 300° C. and 450° C., a pressure between 25 and 200 bar and a space velocity between 0.2 and 5 kg feed per liter of catalyst per hour. Preferably, gas/feed ratios between 250 and 2000 are applied.

The catalysts to be used in the hydrocarbon conversion process according to the present invention, and in particular in the hydrocracking process appear to be very flexible as they are capable of producing product fractions with rather narrow boiling point ranges because of their inherent property of limited overcracking. Therefore, they can be used advantageously in various modes of operation dependent on the desired product slate.

It is thus possible to use as feed a hydrocarbon oil fraction having a boiling point range slightly above the boiling point range of the product to be obtained in the process. However, substantially higher boiling feeds can also be used conveniently to produce materials of similar product boiling point range. For instance, a vacuum gas oil appears to be an excellent feedstock to produce middle distillates using the catalysts in accordance with the present invention but also naphtha can be produced in high yields. By adjusting, for instance, the operating temperature and/or the recycle cut-point (when operating in recycle mode) either middle distillate or naphtha will become the main product whilst retaining high selectivity with respect to the desired product.

The present invention also relates to catalyst compositions comprising a modified Y zeolite having a unit cell size below 24.45 Å, a degree of crystallinity which is at least retained at increasing $SiO_2/Al_2O_3$ molar ratios, a water adsorption capacity (at 25° C. and a $p/p_o$ value of 0.2) of at least 8% by weight of modified zeolite and a pore volume of at least 0.25 ml/g wherein between 10% and 60% of the total pore volume is made up of pores having a diameter of at least 8 nm, an amorphous cracking component, a binder and at least one hydrogenation component of a Group VI metal and/or at least one hydrogenation component of a Group VIII metal, and wherein 50-90% by weight of the catalyst is made up of modified Y zeolite and amorphous cracking component and 10-50% by weight is made up of binder. Preference is given to catalyst compositions wherein 60-85% by weight of the catalyst is made up of modified Y zeolite and amorphous cracking component and 15-40% by weight is made up of binder.

Preferably, the catalyst compositions comprise modified Y zeolites wherein between 10% and 40% of the total pore volume is made up of pores having a diameter of at least 8 nm. The catalyst compositions preferably comprise modified Y zeolites having a water adsorption capacity between 10% and 15% by weight of modified zeolite. Suitably, the modified Y zeolites have a unit cell size below 24.40 Å, in particular below 24.35 Å.

The amount of modified Y zeolite in the catalyst compositions in accordance with the present invention preferably ranges between 10% and 75% of the combined amount of modified Y zeolite(s) and amorphous cracking component. Silica-based cracking components are preferred. The modified Y zeolite in accordance with the present invention has a $SiO_2/Al_2O_3$ molar ratio of from 4 to 25, in particular of from 8 to 15.

The catalyst compositions in accordance with the present invention preferably comprise between 0.05 and 10% by weight of nickel and between 2 and 40% by weight of tungsten, calculated as metals per 100 parts by weight of total catalyst.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The present invention will now be illustrated by means of the following Examples.

EXAMPLE I (a) Preparation of catalyst.

96.5 Grams of a modified Y zeolite having a unit cell size of 24.37 Å, a water adsorption capacity (at 25° C. and a $p/p_o$ value of (0.2) of 11.8% by weight, a nitrogen pore volume of 0.28 ml/g wherein 21% of the total pore volume is made up of pores having a diameter of >8 nm and a loss on ignition (550° C.) of 6.7% by weight is mixed with 625.8 g amorphous silica-alumina (ex Akzo) with a loss on ignition of 18.5% by weight. To this powdery mixture were added a slurry of 500 g of water and 191 g of hydrated aluminum oxide (boehmite, ex Condea) having a loss on ignition of 22% by weight and 7.5 g of acetic acid. After mulling the mixture obtained it was extruded in a Bonnot extruder provided with a die plate producing 1.5 mm extrudates. The extrudates obtained were dried at 120° C. for a 2 hours and finally calcined for 2 hours at 500° C. The extrudates obtained had a water pore volume of 0.83 ml/g.

A nickel/tungsten solution was made up containing 107 g nickel nitrate solution (14% by weight of Ni), 76 g of water and 68 g of ammonium metatungstate (69.5% by weight of W). 25.2 Grams of the nickel/tungsten solution was diluted with water to 42 ml and used to impregnate 50 g of the extrudates described hereinbefore. Finally, the impregnated extrudates were dried at 120° C. for 4 hours and calcined at 500° C. for 1 hour. They contained 2.6% by weight of nickel and 8.2% by weight of tungsten. The ready catalyst contained 10.6% by weight of modified Y zeolite, 68.5% by weight of amorphous cracking component and 20.9% by weight of binder, on a metals free basis.

(b) Hydrocracking experiments.

The catalyst was described in Example Ia was subjected to a hydrocracking performance test involving a hydrotreated heavy vacuum gas oil having the following properties:

| | |
|---|---|
| C (% wt) | 86.1 |
| H (% wt) | 13.9 |
| S (ppm) | 400 |
| N (ppm) | 9 |
| d (70/4) | 0.8277 |

-continued

| | |
|---|---|
| pour point (°C.) | 36 (ASTM D-97) |
| I.B.P. (°C.) | 205° C. |
| 10% wt. rec. | 360 |
| 20% wt. rec. | 399 |
| 30% wt. rec. | 427 |
| 40% wt. rec. | 447 |
| 50% wt. rec. | 465 |
| 60% wt. rec. | 482 |
| 70% wt. rec. | 500 |
| 80% wt. rec. | 521 |
| 90% wt. rec. | 544 |
| F.B.P. | >620 |

The catalyst was firstly subjected to a presulphiding treatment by slowly heating in a 10% v $H_2S/H_2$-atmosphere to a temperature of 370° C. The catalyst was tested in a 1:1 dilution with 0.2 mm SiC particles under the following operating conditions: WHSV 1.45 kg.l$^1$h$^{-1}$, $H_2S$ partial pressure 1.2 bar, total pressure 118 bar and a gas/feed ratio of 1,500 Nl kg$^{-1}$. The experiment was carried out in once-through operation. The catalyst performance is expressed at 50% by weight conversion of 320° C.+ boiling point material in the feed after allowing the catalyst to stabilize.

The following results were obtained:
Temperature required (50% conv. of 320° C.+): 351° C.
Distribution of 320° C.−product (in % by weight)

| | |
|---|---|
| $C_1$-$C_4$ | 6 |
| $C_5$-140° C. | 40 |
| 140° C.-320° C. | 54 |

The chemical hydrogen consumption amount to 0.7% by weight on feed.

EXAMPLE II a) Preparation of catalyst

295 Grams of a modified Y zeolite having a unit cell size of 24.37 Å, a water adsorption capacity (at 25° C. and a $p/p_o$ value of 0.2) of 11.8% by weight, a nitrogen pore volume of 0.28 ml/g wherein 21% of the total pore volume is made up of pores having a diameter of >8 nm and a loss on ignition (550° C.) of 6.8% by weight is mixed with 337 g of amorphous silica-alumina (ex Akzo) with a loss on ignition of 18.4% by weight. To this powdery mixture were added a slurry of 500 g of water and 175 g of hydrated aluminum oxide (boehmite, ex Condea) having a loss on ignition of 21.4% by weight and 6.8 g of acetic acid. After mulling the mixture obtained, it was extruded in a Bonnot extruder provided with a die plate producing 1.5 mm extrudates. The extrudates were dried at 120° C. for 2 hours and finally calcined for 2 hours at 500° C. The extrudates obtained had a water pore volume of 0.73 ml/g.

A nickel/tungsten solution was made up containing 107.2 g of nickel nitrate solution (14% by weight of nickel), 76 g of water and 68.4 g of ammonium metatungstate (69.5% by weight of tungsten). 25.2 Grams of the nickel/tungsten solution was diluted with water to 36.5 ml and used to impregnate 50 g of the extrudates described hereinabove. After homogenizing the impregnated extrudates for 1 hour using a rolling device, the extrudates were dried for 1 hour at 120° C. and calcined for 1 hour at 500° C. They contained 2.6% by weight of nickel and 8.2% by weight of tungsten. The ready catalyst contained 36.6% by weight of modified Y zeolite, 41.8% by weight of amorphous cracking component and 21.6% by weight of binder, on a dry metals freebasis.

(b) Hydrocracking experiments

The catalyst as described in Example IIa was subjected to a presulphiding treatment as described in Example Ib and thereafter tested in a 1:1 dilution with 0.2 mm SiC particles under the operating conditions as described in Example Ib.

The catalyst performance is expressed at 50% by weight conversion of 320° C.+ boiling point material in the feed after allowing the catalyst to stabilize.

The following results were obtained:
Temperature required (50% conv. of 320° C.+): 334° C.
Distribution of 320° C.− product (in % by weight):

| | |
|---|---|
| $C_1$-$C_4$ | 9 |
| $C_5$-140° C. | 41 |
| 140°-320° C. | 49 |

The chemical hydrogen consumption amount to 0.9% by weight on feed.

EXAMPLE III (a) Preparation of the catalyst

A commercially available ammonium-ultra stable zeolite Y having a unit cell size of 24.57 Å, a sodium-oxide content of 0.21% wt and a $SiO_2/Al_2O_3$ molar ratio of about 6 was subjected to an ion-exchange treatment with 0.2 M aluminum sulphate for one hour under reflux conditions. Thereafter, the material thus treated was subjected to a calcination in the presence of steam for a period of one hour at 700° C. The calcined material obtained had a unit cell size of 24.30 Å and a $SiO_2/Al_2O_3$ molar ratio of 6.85.

The material obtained was then subjected to an ion exchange treatment with 0.16 M aluminum sulphate for one hour under reflux conditions followed by a treatment with 1 M ammonium nitrate under the same conditions. This treatment was repeated once. The modified Y zeolite obtained had a unit cell size of 24.32 Å and a $SiO_2/Al_2O_3$ molar ratio of 10.2.

317 Grams of said modified Y zeolite having a unit cell size of 24.32 Å, a $SiO_2/Al_2O_3$ molar ratio of 10.2, a water adsorption capacity (at 25° C. and a $p/p_o$ value of 0.2) of 10.6% by weight, a nitrogen pore volume of 0.47 ml/g wherein 27% of the total pore volume is made up of pores having a diameter >8 nm and a loss on ignition (550° C.) of 21% by weight is mixed with 356 g of amorphous silica-alumina (ex Crosfield) with a loss on ignition of 30% by weight and 168 g of hydrated aluminum oxide (boehmite, ex Condea) having a loss on ignition of 25.8% by weight. A solution of 18.8 g of acetic acid and 342 g of water was added to this mixture. After mulling, the resulting mixture was extruded in a Bonnot provided with a die plate producing 1.5 mm extrudates. The extrudates were dried for 2 hours at 120° C. and calcined for 2 hours at 500° C. The extrudates obtained had a water pore volume of 0.71 ml/g. A nickel/tungsten solution was made up containing 214 g of nickel nitrate solution (14% by weight of nickel), 150 g of water and 136.7 g of ammonium metatungstate (69.5% by weight of tungsten). 65.7 Grams of the nickel/tungsten solution was diluted with water to 93 ml and used to impregnate 131 g of the extrudates described hereinabove. After homogenizing the impregnated extrudates for 1 hour using a rolling device, the extrudates were dried for 2 hours at 120° C. and finally calcined at 500°

C. for 1 hour. They contained 2.6% by weight of nickel and 8.2% by weight of tungsten. The ready catalyst contained 37.7% by weight of modified Y zeolite, 42.3% by weight of amorphous cracking component and 20.0% by weight of binder, on a metals free basis.

(b) Hydrocracking experiments

The catalyst as described in Example IIIa was subjected to a presulphiding treatment as described in Example Ib and thereafter tested as described in Example IIb.

The catalyst performance is expressed at 50% by weight conversion of 320° C.+ boiling point material in the feed after allowing the catalyst to stabilize.

The following results were obtained:
Temperature required (50% conv. of 320° C.+): 330° C.
Distribution of 320° C.− product (in % by weight):

| $C_1$–$C_4$ | 7 |
|---|---|
| $C_5$-140° C. | 40 |
| 140° C.–320° C. | 53 |

The chemical hydrogen consumption amounted to 0.8% by weight on feed.

COMPARATIVE EXAMPLE A (a) Preparation of catalyst 113.8 Grams of a commercially available ultra-stable Y zeolite having a unit cell size of 24.56 Å, a water absorption capacity (at 25° C. and a $p/p_o$ value of 0.2) of 24% by weight and a nitrogen pore volume of 0.38 ml/g wherein 8% of the total pore volume is made up of pores having a diameter of >8 nm and a loss on ignition (550° C.) of 21% by weight was mixed with 626 g of amorphous silica-alumina (ex Akzo) having a loss on ignition (550° C.) of 18.5% by weight. To this powdery mixture were added a slurry of 500 g of water and 191 g of hydrated aluminum oxide (boehmite, ex Condea) having a loss on ignition of 22% by weight and 7.5 g of acetic acid. After mulling the mixture obtained, it was extruded in a Bonnot extruder provided with a die plate producing 1.5 mm extrudates. The extrudates were dried for 2 hours at 120° C. and finally calcined for 2 hours at 500° C. The extrudates obtained had a water pore volume of 0.80 ml/g. A nickel/tungsten solution was made up containing 107.3 g of nickel nitrate (14% by weight of nickel), 76 g of water and 68.4 g of ammonium metatungstate (69.5% by weight of tungsten). 40 Ml of a solution containing water and 25.2 g of the nickel/tungsten solution was used to impregnate 50 g of the extrudates described hereinabove. After homogenizing the impregnated extrudates for 1 hour using a rolling device, the extrudates were dried for 2 hours at 120° C. and calcined for 1 hour at 500° C. They contained 2.6% by weight of nickel and 8.2% by weight of tungsten. The ready catalyst contained 12.2% by weight of zeolite, 67.3% by weight of amorphous cracking component and 20.5% by weight of binder, on a metals free basis.

(b) Hydrocracking experiments

The catalyst as described in Comparative Example A a) was subjected to a presulphiding treatment as described in Example I b and thereafter tested as described in Example I b.

The catalyst performance is expressed at 50% by weight conversion of 320° C.+ boiling point material in the feed after allowing the catalyst to stabilize.

The following results were obtained:
Temperature requirement (50% conv. of 320° C.+) 361° C.
Distribution of 320° C.− product (in % by weight):

| $C_1$–$C_4$ | 9 |
|---|---|
| $C_5$-140° C. | 56 |
| 130° C.–320° C. | 35 |

The chemical hydrogen consumption amounted to 1.0% by weight on feed

COMPARATIVE EXAMPLE B (a) Preparation of catalyst 379.3 Grams of a commercially available ultra-stable Y-zeolite having a unit cell size of 24.56 Å, a water adsorption capacity (at 25° C. and a $p/p_o$ value of 0.2) of 24% by weight and a nitrogen pore volume of 0.38 ml/g wherein 8% of the total pore volume is made up of pores having a diameter of >8 nm and a loss on ignition (550° C.) of 21% by weight was mixed with 368 g of amorphous silica-alumina (ex Akzo) having a loss on ignition (550° C.) of 18.5% by weight. To this powdery mixture was added a slurry containing 191.1 g of hydrated aluminum oxide (boehmite, ex Condea), 500 g of water and 7.5 g of acetic acid. After mulling the mixture obtained, it was extruded in a Bonnot extruder with a die plate producing 1.5 mm extrudates were dried for 2 hours at 120° C. and finally calcined for 2 hours at 500° C. The extrudates obtained had a water pore volume of 0.71 ml/g.

50 Grams of the extrudates thus obtained were impregnated with 36 ml of a solution comprising water and 25.2 g of a solution made up of 107.2 g of nickel nitrate (14% by weight of nickel), 76 g of water and 68.3 g ammonium metatungstate (69.5% by weight of tungsten). After homogenizing the impregnated extrudates were dried for 2 hours at 120° C. and calcined for 1 hour at 500° C. They contained 2.6% by weight of nickel and 8.2% by weight of tungsten. The ready catalyst contained 40.4% by weight of zeolite, 39.2% by weight of amorphous cracking component and 20.4% by weight of binder, on a metals free basis.

(b) Hydrocracking experiments

The catalyst as described in Comparative Example B a) was subjected to a presulphiding treatment as described in Example I b and thereafter tested as described in Example I b.

The catalyst performance is expressed at 50% by weight conversion of 320° C.+ boiling point material in the feed after allowing the catalyst to stabilize.

The following results were obtained:
Temperature required (50% conv. of 320° C.+) 338° C.
Distribution of 320° C.− product (in % by weight):

| $C_1$–$C_4$ | 22 |
|---|---|
| $C_5$-140° C. | 58 |
| 140° C.–320° C. | 20 |

The chemical hydrogen consumption amounted to 1.2% by weight on feed.

It will be clear that the catalysts in accordance with the present invention are more active but also more selective than catalysts based on known ultra-stable Y zeolites. Also the chemical hydrogen consumption is slightly reduced.

We claim:

1. A catalyst composition comprising a modified Y zeolite having a unit cell size below 24.45 Å, a degree of crystallinity which is at least retained at increasing $SiO_2/Al_2O_3$ molar ratios, a water adsorption capacity (at 25° C. and $p/p_o$ value of 0.2) between 10% and 15% by weight of modified zeolite and a pore volume of at least 0.25 ml/g wherein between 10% and 60% of the total pore volume is made up of pores having a diameter of at least 8 nm, an amorphous cracking component, a binder and at least one hydrogenation component of a Group VI metal and/or at least one hydrogenation component of a Group VIII metal, and wherein 50-90% by weight of the catalyst is made up of modified Y zeolite and amorphous cracking component and 10-50% by weight is made up of binder.

2. The catalyst composition according to claim 1, wherein 60-85% by weight of the catalyst is made up of modified Y zeolite and amorphous cracking component and 15-40% by weight is made up of binder.

3. The catalyst composition according to claim 1, wherein between 10% and 40% of the total pore volume of the modified Y zeolite is made up of pores having a diameter of at least 8 nm.

4. The catalyst composition according to any one of claims 1-3, wherein the modified Y zeolite has a unit cell size below 24.40 Å.

5. The catalyst composition according to any one of claims 1-3 wherein the modified Y zeolite has a unit cell size below 24.35 Å.

6. The catalyst composition according to any one of claims 1-3, wherein the amount of modified Y zeolite ranges between 5 and 85% of the combined amount of modified Y zeolite and amorphous cracking component.

7. The catalyst composition according to claim 6, wherein the amorphous cracking component is a silica-based cracking component.

8. The catalyst composition according to claim 6, wherein the modified Y zeolite has a unit cell size below 24.40 Å.

9. The catalyst composition according to claim 6, wherein the modified Y zeolite has a unit cell size below 24.35 Å.

10. The catalyst composition according to any one of claims 7 or 8, wherein the amount of modified Y zeolite ranges between 10 and 75% of the combined amount of modified Y zeolite and amorphous cracking component.

11. The catalyst composition according to any one of claims 1-3, wherein the modified Y zeolite has a $SiO_2/Al_2O_3$ molar ratio of from 4 to 25.

12. The catalyst composition according to any one of claims 1-3, wherein the modified Y zeolite has a $SiO2/Al2O3$ molar ratio of from 8-15.

13. The catalyst composition according to any one of claims 1-3, wherein the catalyst comprises between 0.05 and 10% by weight of nickel and between 2 and 40% by weight of tungsten, calculated as metals per 100 parts by weight of total catalyst.

14. A catalyst composition comprising a modified Y zeolite having a unit cell size below about 24.45 Å, a degree of crystallinity which is at least retained at increasing $SiO_2/Al_2O_3$ molar ratios, a $SiO_2/Al_2O_3$ molar ratio between about 8 to about 15, a water adsorption capacity (at 25° C. and a $p/p_o$ value of 0.2) of between about 10-15% by weight of modified zeolite and a pore volume of at least about 0.25 ml/g wherein between about 10 to about 40% of the total pore volume is made up of pores having a diameter of at least about 8 nm; an amorphous cracking component comprising a silica-alumina containing 50-95% by weight of silica; a binder comprising alumina; from about 0.05 to about 10 percent by weight of nickel and from about 2 to about 40 percent by weight of tungsten, calculated as metals per 100 parts by weight of total catalyst, wherein the modified Y zeolite and amorphous cracking component comprises about 60-85% by weight of the total catalyst, the binder comprises about 15-40% by weight of the total catalyst and the amount of modified Y zeolite ranges between about 10-75% of the combined amount of modified Y zeolite and amorphous cracking component.

15. The catalyst composition of claim 14 wherein the modified Y zeolite has a unit cell size below about 24.40 Å.

16. The catalyst composition of claim 14 wherein the modified Y zeolite has a unit cell size below about 24.35 Å.

* * * * *